(12) United States Patent
Hebert

(10) Patent No.: US 6,412,360 B1
(45) Date of Patent: Jul. 2, 2002

(54) SPACECRAFT TEST SYSTEM

(75) Inventor: Barry F. Hebert, 1230 Horn Ave., #610, West Hollywood, CA (US) 90069

(73) Assignee: Barry F. Hebert, West Hollywood, CA (US)

( * ) Notice: Subject to any disclaimer, the term of this patent is extended or adjusted under 35 U.S.C. 154(b) by 0 days.

(21) Appl. No.: 09/407,624

(22) Filed: Sep. 28, 1999

(51) Int. Cl.7 .................................................. B64G 7/00
(52) U.S. Cl. ...................................................... 73/865.6
(58) Field of Search ........................... 73/865.3, 865.6, 73/116, 865.9; 318/648, 649

(56) References Cited

U.S. PATENT DOCUMENTS

| | | |
|---|---|---|
| 3,225,608 A | 12/1965 | Simon |
| 3,370,205 A | 2/1968 | Dukes et al. |
| 4,170,904 A | 10/1979 | Fischell et al. |
| 4,648,273 A | 3/1987 | Ozols |
| 4,860,600 A * | 8/1989 | Schumacher ............... 73/865.6 |
| 4,908,558 A | 3/1990 | Lordo et al. |
| 5,309,766 A * | 5/1994 | Touzeau et al. ........... 73/865.6 |
| 5,319,275 A | 6/1994 | Tozoni |
| 5,485,748 A | 1/1996 | Zeamer |
| 5,501,114 A * | 3/1996 | Okamoto et al. .......... 73/865.6 |

* cited by examiner

Primary Examiner—Robert Raevis

(57) ABSTRACT

A spacecraft motion simulation device provides up to four degrees of freedom of motion to a test article and enables viewing a picture on a projection screen from a camera within the test article. One or more of such pictures may be moved during the test and the test article may be thus also moved in accordance with the testing of controls thereon. Closed loop control of the test article may be achieved using attitude control circuits for adjusting test article position and attitude relative to recognized elements within the projected screens.

10 Claims, 2 Drawing Sheets

SPACECRAFT TEST SYSTEM

For purposes of establishing an earlier date of conception in the present application a previously filed Document Disclosure having Ser. No. 448693 and an assigned filing date of Dec. 15, 1998 and which contains subject matter substantially the same as that described and claimed in the present application.

BACKGROUND OF THE INVENTION

1. Field of the Invention

This invention relates generally to dynamic test fixtures, and more particularly to a test fixture for a miniature space craft for simulation and testing of thrust devices and controls.

2. Description of Related Art

The following art defines the present state of this field:

Simon, U.S. Pat. No. 3,225,608 describes a diamagnetic suspension apparatus including a body of diamagnetic material; an inhomogeneous magnetic field volume which is symmetrical about the longitudinal axis thereof, the field intensity within the volume increasing rapidly with the radial distance from the longitudinal axis, the field intensity also increasing rapidly with the distance along the longitudinal axis in a predetermined direction, the diamagnetic body being normally freely suspended within the volume in a position which is substantially symmetrical about the axis.

Dukes et al., U.S. Pat. No. 3,370,205 describes a magnetic suspension system for supporting in a substantially invariant orientation of a magnetizable suspended body whose position may vary comprising, in combination a system of three sets of magnetic-field-producing (m.f.p.) elements, said sets arranged to produce three orthogonal magnetic forces which suspend the body and control its movement with respect to three orthogonal axes, the magnetic force component produced by each set being a function of an electrical parameter in such a way that the average value of said parameter is that required to position said suspended body at its nominal equilibrium point, position-sensing means for detecting changes in position of said suspended body along said three orthogonal axes and for providing signals proportional in value to said changes, and feedback control means for utilizing each of said change-proportional signals to vary the value of said parameter in the proper set of m.f.p. elements to produce the compensatory change in its field strength required to return said body to its nominal equilibrium point along the axis associated with that set of m.f.p. elements.

Fischell et al., U.S. Pat. No. 4,170,904 describes an improved system for sensing and compensating for external disturbance forces acting on a satellite while in orbit. A proof mass member is housed within an enclosure and shielded from external, non-gravitational forces. The proof mass is electromagnetically levitated to move in a purely gravitational orbit, along an axis aligned with the satellite's velocity vector. The proof mass is subjected to a controlled magnetic biasing field and is caused to have a constant reaction to the resultant biasing force, by means of a thermal control system which maintains constant resistivity of the proof mass, during operation. The position of the proof mass with respect to its axis is detected optically and is utilized to control the firing of spacecraft thrusters. As a result, the satellite is caused to maintain a substantially constant position relative to the proof mass and thereby also is caused to follow a purely gravitational orbit.

Ozols, U.S. Pat. No. 4,648,273 describes a device for detecting the influence of a gravitational force on a body due to changes in a freefall state. The device includes a spherical housing, and a flow medium is contained in, and is adapted to travel about and undergo flow in the housing. Monitoring means are provided at presence or absence of medium at said positions.

Lordo et al., U.S. Pat. No. 4,908,558 describes a flight motion simulator including a unit under test supported on a stationary frame for angular and translational movement along pitch, roll, and yaw axes. A rotor element is secured to the unit under test and has a spherical configuration. Magnetic bearings supported by the stationary frame support the rotor element in three degrees of freedom of movement. A drag-cup induction motor is mounted on the frame and connected to the unit under test to generate three degrees of freedom of movement by generating a rotating magnetic flux in a stator assembly to induce a corresponding flow of currents in the rotor element to produce torque and motion in the unit under test in the same direction as the flux movement in the stator assembly.

Tozoni, U.S. Pat. No. 5,319,275 describes a magnetic levitation self-regulating system having enhanced stabilizational forces designated for immobile, or forward, or rotational motion and stable hovering of heavy masses (working bodies) in both gravity and weightlessness are proposed. This system includes a stator assembly and a levitator assembly. The stator assembly comprises split iron cores with air gaps between their core shoes fixed on a nonmagnetic foundation and magnetic screens in the capacity of which serve superconductive, or permanent magnetic, or nonmagnetic conductive strips. The levitator assembly comprises permanent magnets couplet together by non-magnetic couplers and disposed into the air gaps of the stator assembly. The levitator magnets are magnetized across the air gaps of the stator and generate the primary magnetic field, magnetizing the iron cores, which, in turn, create a secondary magnetic field. The magnetic screens change distribution of the primary and secondary magnetic fields in the air gaps. The resulting magnetic field creates a stabilizational forces providing a stable hovering of the levitator without any active control system and additional energy sources.

Zeamer, U.S. Pat. No. 5,485,748 describes a magnetically levitated force/weight measurement apparatus including a system core with a plurality of layered circular segments having apertures that define an internal chamber. The segments include, inter alia, upper and lower magnetic bearing segments, a coil segment and an optical detector segment, each of which cooperate to generate magnetic fields for levitating a mass disposed within the chamber. Levitation magnets, rigidly disposed within the mass along a center axis, are arranged such that similar poles are in facing relation. This novel arrangement generates a static magnetic field that radiates orthogonally and symmetrically from the mass and generates a force vector for levitating the mass along the center axis. Bearing magnets, disposed within the magnetic bearing segments, i.e., core bearing magnets, and the spool, i.e., spool bearing magnets, are also arranged such that the polar axes of the core bearing magnets are aligned in the same direction as the polar axes of their corresponding spool bearing magnets. A self-dampening optical and current feedback system ensures that, upon displacement of the spool along the center axis, the spool returns to a stable equilibrium position.

The prior art teaches magnetic suspension and levitation systems, simulators of various types, force responsive devices, disturbance compensation systems, and force/weight measurement systems. However, the prior art does not teach that a spacecraft motion simulation device may be constructed in accordance with the present instruction or used with a closed loop camera system. The present invention fulfills these needs and provides further related advantages as described in the following summary.

SUMMARY OF THE INVENTION

The present invention teaches certain benefits in construction and use which give rise to the objectives described below.

The present invention provides a spacecraft motion simulation device providing up to four degrees of freedom of motion to a test article and enables viewing a picture on a projection screen from a camera within the test article. One or more of such pictures may be moved during the test and the test article may be thus also moved in accordance with the testing of controls and thrusters on the test article. Closed loop control of the test article may be achieved using attitude control circuits for adjusting test article position and attitude relative to recognized elements within the projected screens.

A primary objective of the present invention is to provide a spacecraft motion simulation device having advantages not taught by the prior art.

Another objective is to provide near friction free support and frictionless levitation to a test article through a test fixture.

A further objective is to provide a means for viewing scenes from the test article so as to judge the effectiveness of test article thrust controls as well as the efficiency of the control system.

A further objective is to provide a means for achieving closed loop control of the test article by using attitude control circuits for adjusting test article position and attitude relative to recognized elements within the projected screens.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
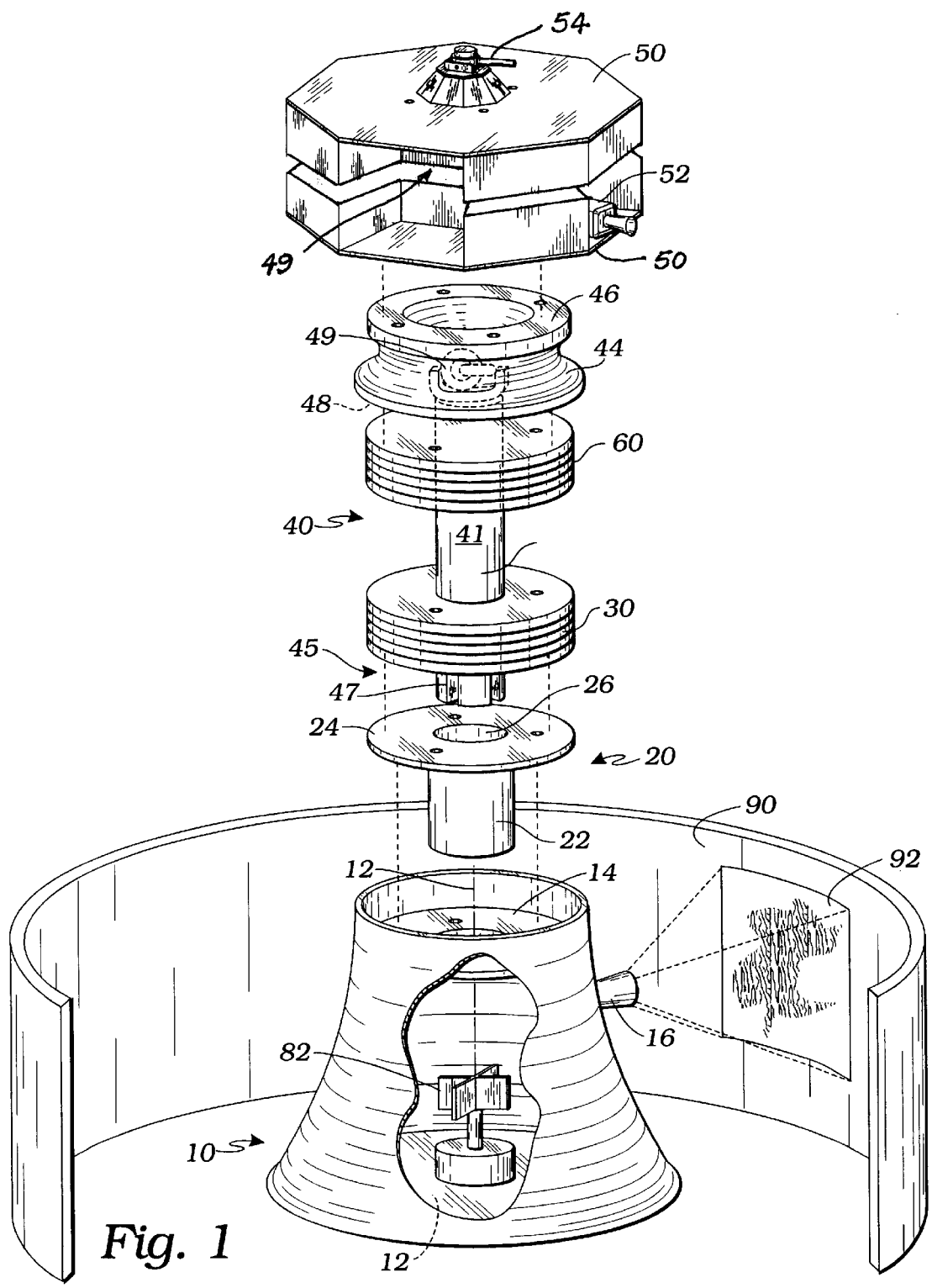
FIG. 1 is a perspective view of the preferred embodiment of the present invention.

The above described drawing figures illustrate the invention, a test fixture apparatus comprising a base 10 providing a downwardly facing base rest surface 12 for resting the base 10 thereupon in a generally vertical and stable attitude, and a vertically disposed base receiving means 14 such as the disk-shaped bulkhead shown in FIG. 1. A linear actuator support 20 comprises a first cylindrical shaft 22 adapted for sliding tightly into the base receiving means 14. The first cylindrical shaft 22 terminates with a disc-shaped first support flange 24 at an upper end thereof which is secured using common fasteners in the holes shown. A first levitation producing means 30 is adapted for mounting fixedly to the first support flange 24 again, using the holes shown with common fasteners. A linear actuator 40 comprises a second shaft adapted by its shape and size for sliding vertical motion within the first cylindrical shaft 22, and further includes a disk shaped second support flange 44 having an upwardly facing flange surface 46 enabled for removably engaging one or more test pieces 50 thereon, such as miniature space crafts, etc., and further has a downwardly facing flange surface 48. A second levitation producing means 60 is adapted for being mounted fixedly to the downwardly facing flange surface 48 of the second support flange 44 using the holes shown with common fasteners. The first and second levitation producing means 30, 60 are oriented for unilateral or bilateral (mutual) repulsion, in a manner described below, for levitating the linear actuator 40 and the test piece 50 which is mounted on it. Clearly, with the ability to translate and rotate, the test piece 50 is able to be positioned in any attitude about a ring over a range of vertical positions, but with a gimbals 49 positioned as shown it is possible to provide tilt as well so as to fully simulate most positional changes in the craft. Such an interconnection as the gimbals 49 may be used between two or more test pieces 50 to enable more complex motion and testing as shown in FIG. 1 where two test pieces 50 are mounted one above the other and interconnected by a second gimbals 49.

An inside surface 26 of the first cylindrical shaft 22 and an outside surface 41 of the linear actuator 40 are low friction surfaces enabling the linear actuator 40 to both translate and rotate within the linear actuator support 20 with near friction-free motion. The low friction surfaces are achieved though the use of Teflon® either as the structural material or as a coating or over-layer on a harder and stiffer material such as aluminum.

Figure 2:
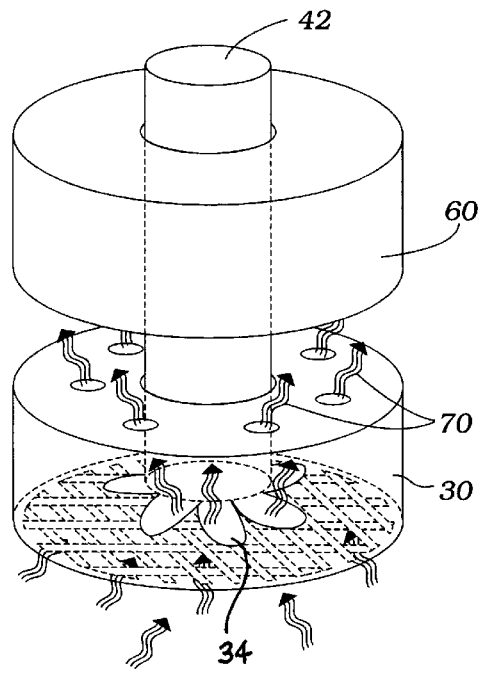
FIG. 2 is a mechanical schematic diagram of one embodiment of a levitation means thereof.

In one embodiment, at least one of the first and the second levitation producing means 30, 60 is an air current generating device, such as a fan 34 as shown in FIG. 2, and which is enabled by its size and positional orientation for directing air currents 70 for forcing the first and the second levitation producing means 30, 60 into a spaced apart state as shown in FIG. 2.

In another embodiment, at least one of the first 30 and the second 60 levitation producing means is a permanent magnet or an electromagnet and preferably the stationary first levitation means 30 is the electromagnet. In this manner, the levitation force is variable and controllable for changing the vertical position of the test article.

The present invention inventively further comprises a rotational prime mover, such as an electric stepping motor or such, fixed within the base 10 and adapted by its position, for rotation about a longitudinal axis 12 of the apparatus. The prime mover provides a rotational forcing with first translational sliding engagement means 82 which is, in the preferred embodiment, a vertically oriented multi-blade fixture as shown. Inventively, the linear actuator 40 provides, at a lower terminal end 45 thereof, a second translational sliding engagement means 47, preferably a set of slots corresponding to the multi-blade fixture, adapted, by size, shape and clearance for translational sliding engagement with the first translational sliding engagement means 82 for providing rotation of the linear actuator 40 while enabling translation of the linear actuator 40 relative to the prime mover.

The base 10, inventively further provides at least one picture projecting means, 16, such as a slide projector or a video or film projector. The apparatus further includes a projection screen, which may be a flat screen, a curved screen, a cylindrical screen much like that shown in FIG. 1 or even a spherical screen for providing a full 360 steradians of visual orientation. The screen 90 is positioned laterally relative to the base 10 and the test piece 50. The screen 90 receives at least one picture 92 projected thereon by the picture projecting means 16, or alternately, the projecting means 16 may be replaced by an liquid crystal display device. The test piece 50 further comprises a camera 52 positioned and adapted for viewing the at least one picture 92 on the projection screen 90. Clearly, the spacecraft or test piece may be any test object including just the camera alone, etc. The test piece would normally carry test equipment, projectors, cameras, inertial and other types of sensors, etc.

Figure 3:
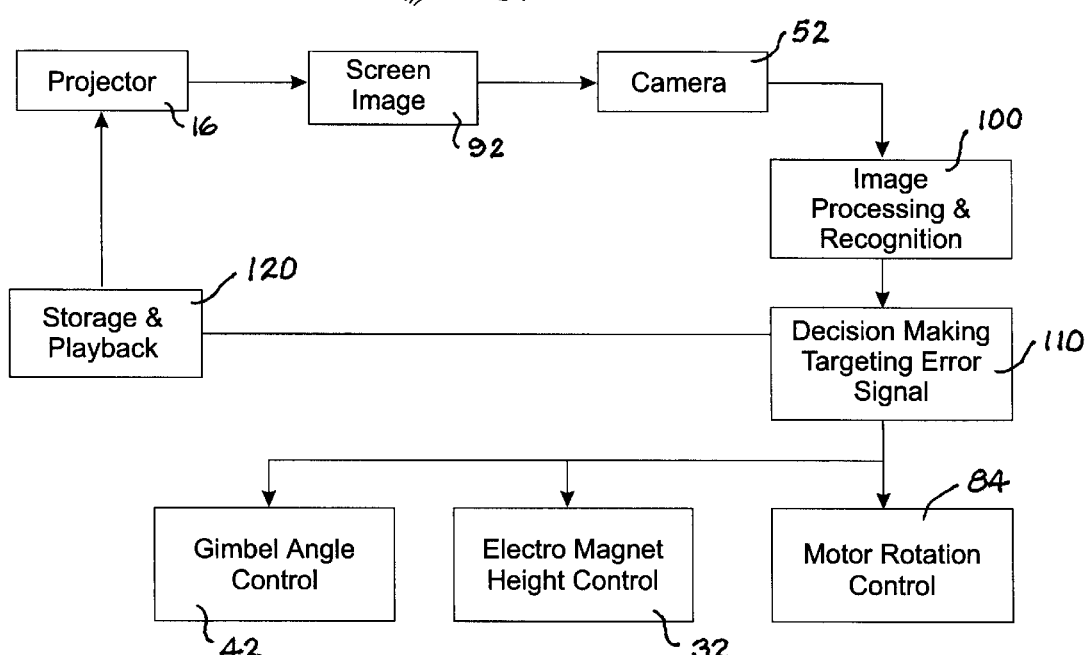
FIG. 3 is a system block diagram defining the manner in which the invention is used.

In operation, the present invention, as shown in FIG. 3, uses the projector 16 to place an image 92 onto screen 90. This image may be static or moving. Multiple projectors may be used to produce multiple images 92 simultaneously or a continuous image as of a landscape in scope and extent up to 360 steradians on a spherical screen. One or more cameras 52 on board the test article (space vehicle) 50 are positioned to view and record the scenes of the image(s) 92. The recorded scene image 92 is processed by an image processing and recognition circuitry 100 of any well known and commercially available type, or which may be part of a custom circuit, data processor and software prepared by those of skill in the art without difficulty. Next, a decision making, targeting and error signal processor 110 may be used to provide correction signals to a motor rotation control circuit 84 for rotationally positioning the test piece 50 via the prime mover (motor), and for changing the vertical height of the test piece 50 via the electromagnet height control circuit 32 and the electromagnet 30 by changing the magnetizing current, and by changing the angle of the test piece 50 via a gimbals angle control circuit for controlling the motion of gimbals 49. The camera generated scene material may be stored in a storage and playback module 120 on a hard drive or alternate storage medium, and the projector 16 may therefore be controlled in a closed loop control approach to advantageously change the scene content or position projected onto the screen 90. The object achieved here is the facilitation of testing of the controls and thrust mechanisms 54 of the test article 50, that is to say, remote or on-board attitude control signals driving the stabilizing and thrust controls 54 of the test article 50 may be made responsive to visual elements of the scene 92 recognized by the image processing and recognition circuit 100 so as to achieve full closed loop control during test processing. These tests are effective for evaluation of both external forces on the craft as well as to substitute for or complement on-board thrusters in the evaluation of craft maneuvers.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A test fixture apparatus comprising:
    a base providing a downwardly facing base rest surface for resting the base thereupon in a generally vertical attitude, and a vertically disposed base receiving means;
    a linear actuator support comprising a first cylindrical shaft adapted for sliding motion within the base receiving means, the first cylindrical shaft terminating with a disc-shaped first support flange at an upper end thereof;
    a first levitation producing means adapted for mounting fixedly to the first support flange;
    a linear actuator comprising a second shaft adapted for sliding vertical motion within the first cylindrical shaft, and further including a disk shaped second support flange having an upwardly facing flange surface removably engaging a test piece thereon and a downwardly facing flange surface; and
    a second levitation producing means adapted for mounting fixedly to the downwardly facing flange surface of the second support flange;
    the first and second levitation producing means oriented for mutual repulsion for levitating the linear actuator and the test piece therewith.

2. The apparatus of claim 1 wherein an inside surface of the first cylindrical shaft and an outside surface of the linear actuator provide low friction surfaces enabling the linear actuator to translate and rotate within the linear actuator support with near friction-free linear motion.

3. The apparatus of claim 1 wherein at least one of the first and the second levitation producing means is an air current generating device enabled for directing air currents for forcing the first and the second levitation producing means into a spaced apart state.

4. The apparatus of claim 1 wherein at least one of the first and the second levitation producing means is a permanent magnet.

5. The apparatus of claim 1 wherein at least one of the first and the second levitation producing means is an electromagnet.

6. The apparatus of claim 1 further comprising a rotational prime mover fixed within the base and adapted for rotation about a longitudinal axis of the apparatus, the prime mover providing a rotational force at first translational sliding engagement means.

7. The apparatus of claim 6 wherein the linear actuator provides, at a lower terminal end thereof, a second translational sliding engagement means adapted for translational sliding engagement with the first translational sliding engagement means for providing rotation of the linear actuator while enabling translation of the linear actuator relative to the prime mover.

8. The apparatus of claim 1 wherein the base further provides at least one picture projecting means, the apparatus further including a projection screen positioned laterally relative to the base and the test piece the projection screen receiving at least one picture projected thereon by the picture projector, the test piece further comprising a camera positioned and adapted for viewing the at least one picture on the projection screen.

9. The apparatus of claim 8 further comprising an image processing and recognition circuitry for generating attitude orientation signals relative to the at least one picture, a decision making, targeting and error signal processor for providing correction signals to a motor rotation control circuit for rotationally positioning the test piece via the prime mover and for changing the vertical height of the test piece via the electromagnet height control circuit, and by changing the angle of the test piece via a gimbals angle control circuit.

10. The apparatus of claim 9 further comprising a storage and playback module for recording signals generated in the operation of the apparatus and for controlling the scene content and scene position projected onto the screen so as to achieve full closed loop control during test processing of the test piece.

* * * * *